United States Patent
Nishimura

(10) Patent No.: US 11,396,144 B2
(45) Date of Patent: Jul. 26, 2022

(54) AUTOMATED FIBER BUNDLE PLACEMENT DEVICE

(71) Applicant: TSUDAKOMA KOGYO KABUSHIKI KAISHA, Ishikawa-ken (JP)

(72) Inventor: Isao Nishimura, Ishikawa-ken (JP)

(73) Assignee: TSUDAKOMA KOGYO KABUSHIKI KAISHA, Ishikawa-Ken (JP)

( * ) Notice: Subject to any disclaimer, the term of this patent is extended or adjusted under 35 U.S.C. 154(b) by 0 days.

(21) Appl. No.: 17/184,163

(22) Filed: Feb. 24, 2021

(65) Prior Publication Data

US 2021/0276283 A1    Sep. 9, 2021

(30) Foreign Application Priority Data

Mar. 5, 2020   (JP) .............................. JP2020-038169

(51) Int. Cl.
*B29C 70/38*   (2006.01)
*B29C 70/54*   (2006.01)

(52) U.S. Cl.
CPC .......... *B29C 70/384* (2013.01); *B29C 70/545* (2013.01)

(58) Field of Classification Search
CPC ..... B29C 70/38; B29C 70/382; B29C 70/384; B29C 70/386; B29C 70/388; B29C 70/545; B29D 5/086
See application file for complete search history.

(56) References Cited

U.S. PATENT DOCUMENTS

| | | | |
|---|---|---|---|
| 3,080,784 A * | 3/1963 | Schneider | B26D 7/2635 83/482 |
| 5,110,395 A | 5/1992 | Vaniglia | |
| 2008/0302483 A1 | 12/2008 | Vaniglia | |
| 2009/0229760 A1* | 9/2009 | Hamlyn | B29C 70/384 156/433 |
| 2015/0013892 A1 | 1/2015 | Horst et al. | |
| 2020/0062436 A1* | 2/2020 | Kirsch | B65B 11/54 |

FOREIGN PATENT DOCUMENTS

| | | |
|---|---|---|
| JP | 2015-016691 A | 1/2015 |
| JP | 2019-130914 A | 8/2019 |

OTHER PUBLICATIONS

Jun. 28, 2021, European Search Report issued for related EP application No. 21158719.1.

* cited by examiner

*Primary Examiner* — George R Koch
(74) *Attorney, Agent, or Firm* — Paratus Law Group, PLLC

(57) ABSTRACT

A cutting device includes a drive mechanism for causing displacement of a cutting blade toward a cutting position on a securing member side which pinches a route with the cutting blade provided for each route of a fiber bundle. The drive mechanism includes a plate-shaped movable unit provided for each of the cutting blades, to which the cutting blade is attached, a support unit supporting the movable unit to be displaceable and facing the movable unit in a plate-shaped part, a permanent magnet provided on one side in the movable unit and the plate-shaped part, and an exciting coil provided on the other side. The permanent magnet and the exciting coil are provided so that the movable unit is displaced as the exciting coil is excited.

8 Claims, 7 Drawing Sheets

AUTOMATED FIBER BUNDLE PLACEMENT DEVICE

CROSS-REFERENCE TO RELATED APPLICATIONS

The present application claims priority from Japanese Patent Application No. 2020-038169, filed on Mar. 5, 2020, the entire subject matter of which is incorporated herein by reference.

BACKGROUND OF THE INVENTION

Field of the Invention

The present invention relates to an automated fiber bundle placement device including a supply device configured so that a plurality of bobbins around which fiber bundles are wound are installed to supply the fiber bundles from each of the bobbins, a placement head for placing each of the fiber bundles supplied from the supply device on a placement die, and an articulated robot having the placement head attached thereto to move the placement head for the placement, in which the placement head includes a pressing unit that presses the fiber bundle onto the placement die, a feeding mechanism that feeds the fiber bundle toward the pressing unit, and a cutting device that cuts the fiber bundle between the pressing unit and the feeding mechanism.

Background Art

As an automated fiber bundle placement device, an automated fiber placement (AFP) device which places a narrow fiber bundle on a placement die is known. In the present application, the "fiber bundle" refers to a material such as a so-called tow prepreg formed in a tape shape by impregnating a bundle of a plurality of reinforcing fibers (carbon fibers or glass fibers) with a matrix resin. As the AFP device, there is a device configured to place the fiber bundle on the placement die by using an articulated robot.

As the AFP device, JP-A-2019-130914 discloses a device including an unwinding mechanism configured to unwind (send) a fiber bundle from a bobbin around which the fiber bundle is wound, and a sticking head as a placement head for performing the placement, which is a sticking head attached to the articulated robot. In the AFP device disclosed in JP-A-2019-130914, the sticking head has a pressing member such as a roller and a shoe as a pressing unit that presses the fiber bundle against an attachment target surface (onto the placement die), and a feeder as a feeding mechanism that feeds the fiber bundle toward the pressing member. Although a specific configuration is not disclosed in JP-A-2019-130914, a configuration is disclosed in which the sticking head has a fiber bundle cutting unit for cutting the fiber bundle so that the fiber bundle having a predetermined length is placed on the placement die.

As the AFP device. JP-A-2015-016691 discloses a device configured to place a plurality of tows (fiber bundles) on a preform (placement die) by using an NC machine (robot arm) as the articulated robot and a supply head as the placement head. JP-A-2015-016691 discloses a unit (cutting unit) of the supply head that functions as a cutting device for cutting the fiber bundle as described above.

With regard to the cutting unit, more specifically, the cutting unit includes a cutter rocker arm provided for each of the fiber bundles, supported by a cutter rocker shaft, and provided to be capable of pivoting (rocking) around the shaft, and a cutter blade attached to each of the cutter rocker arms. The supply head includes a piston provided for each of the cutter rocker arms, and the cutting unit is configured as follows. In accordance with a forward and rearward moving operation of the piston, the cutter rocker arm pivots to cut the fiber bundle. The forward and rearward moving operation of the piston is performed by air pressure.

Incidentally, when a plurality of fiber bundles are placed on the placement die in the above-described AFP device, the fiber bundles are usually placed so that no gap is formed between the fiber bundles adjacent to each other. Therefore, the placement head in the AFP device is configured so that the plurality of fiber bundles are supplied toward the pressing unit in a state of having no gap.

In the AFP device, when the cutting device adopts a configuration in which a cutting blade is operated by the forward and rearward moving operation of the piston as in the device disclosed in JP-A-2015-016691 (device in the related art), a cross sectional area of the piston needs to increase to some extent in order to obtain a desired cutting force. An interval for disposing the pistons is determined depending on the cross sectional area of the piston. The piston and the cutting blade, and the cutting blade and the fiber bundle are provided corresponding to a one-to-one relationship. Accordingly, since the interval for disposing the pistons increases, the fiber bundles can be placed without any gap as described above, and a width of the fiber bundle has to inevitably increase.

However, when the width of each of the plurality of fiber bundles simultaneously placed on the placement die is increased, in a case where a shape of the placement die is complicated, the fiber bundle placed on the placement die has wrinkles, thereby causing a problem in that proper placement cannot be performed in some cases. Therefore, the AFP device adopting the device in the related art cannot cope with the placement die having a complicated shape, thereby causing a problem in that an applicable range is limited.

SUMMARY OF THE INVENTION

In view of the above-described circumstances, the present invention aims to provide a configuration of a cutting device which can prevent the above-described problems by minimizing a width of each of a plurality of fiber bundles as much as possible, in an automated fiber bundle placement device that disposes the plurality of fiber bundles on a placement die.

According to an aspect of the present invention, there is provided an automated fiber bundle placement device including a supply device configured so that a plurality of bobbins around which fiber bundles are wound are installed to supply the fiber bundles from each of the bobbins, a placement head for placing each of the fiber bundles supplied from the supply device on a placement die, and an articulated robot having the placement head attached thereto to move the placement head for the placement. The placement head includes a pressing unit that presses the fiber bundle onto the placement die, a feeding mechanism that feeds the fiber bundle toward the pressing unit, and a cutting device that cuts the fiber bundle between the pressing unit and the feeding mechanism. The present invention has the following aspects in the automated fiber bundle placement device.

The cutting device includes a cutting blade provided for each route of the fiber bundle to intersect with a traveling direction of the fiber bundle, a securing member provided to pinch the route with the cutting blade, and a drive mechanism for causing displacement of the cutting blade toward a cutting position on the securing member side. The drive mechanism includes a plate-shaped movable unit provided for each of the cutting blades, to which the cutting blade corresponding thereto is attached, a support unit supporting the movable unit to be displaceable, having a plate-shaped part which is a part having a plate shape, and facing the movable unit in the plate-shaped part, a permanent magnet provided in one of a part facing the plate-shaped part of the support unit in the movable unit and a part facing the movable unit in the plate-shaped part of the support unit, and an exciting coil provided in the other. The permanent magnet and the exciting coil are provided so that the movable unit is displaced as the exciting coil is excited.

In the automated fiber bundle placement device according to the present invention, the movable unit may be supported to be capable of rocking with respect to the support unit. In the automated fiber bundle placement device, the support unit may be provided for each of the movable units. In the automated fiber bundle placement device, both the displacement of the cutting blade and retreating of the cutting blade from the cutting position may be performed by excitation of the exciting coil.

According to the automated fiber bundle placement device of the present invention, in the cutting device in the placement head of the automated fiber bundle placement device, it is possible to minimize an interval for disposing the movable units to which the cutting blades are attached in each of the drive mechanisms that displace each of the cutting blades. As a result, it is possible to minimize a width of each of the fiber bundles.

More specifically, in the cutting device in the placement head of the automated fiber bundle placement device according to the present invention, each of the drive mechanisms that displace each of the cutting blades is configured to mainly include the plate-shaped movable unit to which the cutting blades are attached and the support unit that supports the movable unit. The movable unit is supported to be displaceable with respect to the support unit in a form of facing the plate-shaped part of the support unit. Therefore, a configuration is adopted in which each of the drive mechanisms is provided so that the movable unit is displaced along a plate surface of the plate-shaped part in the support unit.

The fiber bundles are placed to be aligned with each other. Accordingly, the cutting blades are aligned with each other in an alignment direction thereof, and the respective drive mechanisms corresponding to the respective cutting blades are also aligned with each other in the alignment direction. The movable unit is displaced with respect to the support unit as described above. Accordingly, the movable unit and the support unit are provided in a state where a facing direction of the movable unit and the plate-shaped part coincides with the alignment direction. Therefore, a dimension occupied by the movable unit and the support unit in the alignment direction inside the drive mechanism is a total of a dimension of the movable unit and a dimension of the support unit in the alignment direction. In order to minimize the dimension as much as possible, a configuration is conceivable in which the total dimension of the movable unit and the support unit substantially coincides with or is close to a total of a plate thickness dimension of the movable unit and a plate thickness dimension of the plate-shaped part.

In the present invention, a drive unit as a drive source for displacing the movable unit with respect to the support unit as described above is configured to include the permanent magnet and the exciting coil. The drive mechanism is configured to be provided between facing surfaces of the movable unit and the plate-shaped part which the drive unit faces as described above. That is, the drive unit is provided so that the permanent magnet and the exciting coil face each other in the alignment direction. In this manner, the dimension (width dimension) of each of the drive mechanisms in the alignment direction can be approximately as large as the dimension obtained by adding the plate thickness dimension of the movable unit and the plate thickness dimension of the plate-shaped part of the part where the drive unit is placed to the dimension of the drive unit in the alignment direction.

Therefore, the width dimension of each of the drive mechanisms is minimized, compared to the cutting device in which the drive source for operating the cutting blade is a mechanism using a piston as in the related art. Accordingly, it is possible to minimize the interval for disposing the movable units in the plurality of drive mechanisms aligned with each other in the alignment direction. As a result, the fiber bundles are disposed without any gap as described above, and the width of each of the fiber bundles is minimized in accordance with the interval for disposing the movable units. In this manner, the above-described problem does not occur.

In the automated fiber bundle placement device according to the present invention, each of the drive mechanisms is configured so that the movable unit is supported to be capable of rocking with respect to the support unit. In this manner, each of the drive mechanisms is configured to rock the cutting blade so that the cutting blade attached to the movable unit is displaced in the traveling direction of the fiber bundle. In this manner, in the placement head including the cutting device including each of the drive mechanisms, the fiber bundle can be cut by displacing the cutting blade in this way, without causing the feeding mechanism to stop feeding the fiber bundle toward the pressing unit.

In each of the drive mechanisms, the support unit is configured to be provided for each of the movable units. In other words, the support unit is configured to be independently provided for each of the movable units provided corresponding to each of the cutting blades. In this manner, each of the drive mechanisms can be individually attached to and detached from the cutting device. In this manner, even when one of the plurality of drive mechanisms in the cutting device provided inside the placement head has a problem such as a malfunction of the movable unit, only the drive mechanism having the problem can be detached from the cutting device (placement head).

The drive unit is configured so that both the displacement of the cutting blade toward the cutting position and the retreating of the cutting blade from the cutting position are performed by the excitation of the exciting coil. Accordingly, compared to a case where the drive unit is configured so that one of the displacement and the retreating is performed by a mechanical configuration such as a spring, it is possible to reduce types of components forming the drive unit in each of the drive mechanisms. In this manner, the cutting device according to the present invention can be realized with a simpler configuration.

DETAILED DESCRIPTION OF THE INVENTION

Hereinafter, an embodiment of an automated fiber bundle placement device according to the present invention will be described with reference to FIGS. 1 to 6.

Figure 1:
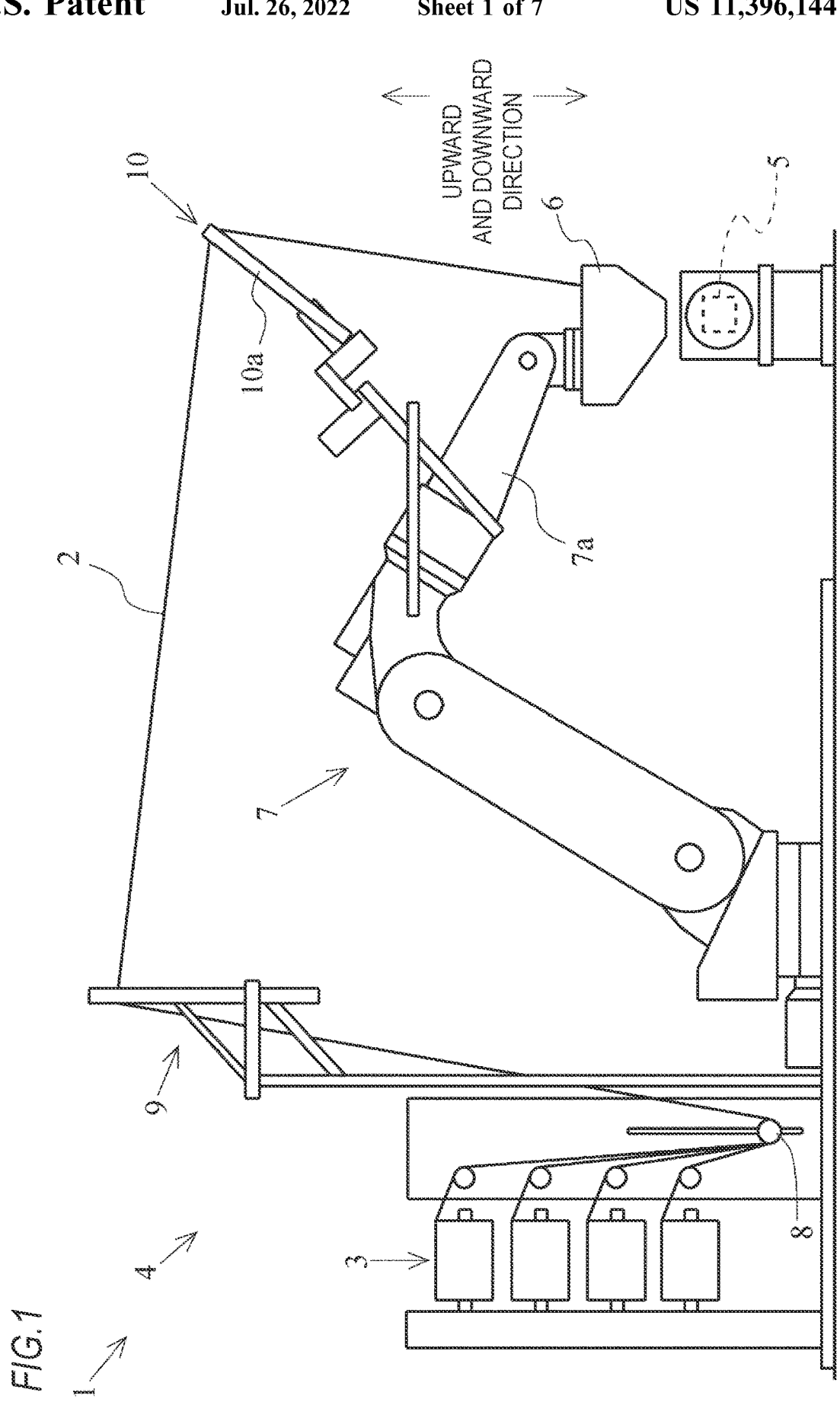
FIG. 1 is a schematic side elevation illustrating an example of an automated fiber bundle placement device according to the present invention.

As illustrated in FIG. 1, an automated fiber bundle placement device 1 includes a supply device 4 in which a bobbin 3 around which a fiber bundle 2 is wound is installed, a placement head 6 for placing the fiber bundle 2 supplied from the supply device 4 on a placement die 5, and an articulated robot 7 that moves the placement head 6 for the placement. In the present embodiment, the automated fiber bundle placement device 1 is configured so that the placement of 16 fiber bundles 2 can be simultaneously performed. Therefore, 16 bobbins 3 are installed in the supply device 4, although only four on a front side are illustrated in the drawing.

The supply device 4 includes a guide unit 9 that guides the fiber bundle 2 pulled out from each of the bobbins 3 toward the articulated robot 7 side. The guide unit 9 includes a guide member (not illustrated) provided for each of the fiber bundles 2 to individually guide each of the fiber bundles 2, and is configured so that the guide member guides each of the fiber bundles 2 to a position higher than that of the articulated robot 7. The supply device 4 includes a dancer roll 8 common to each of the fiber bundles 2, as a configuration for adjusting tension of each of the fiber bundles 2 in a route of the fiber bundles 2 between each of the bobbins 3 and the guide unit 9. According to the configuration, each of the fiber bundles 2 is adjusted to have proper tension between the bobbin 3 and the guide unit 9, and is pulled out to the articulated robot 7 side in a proper tension state.

A guide mechanism 10 for guiding each of the fiber bundles 2 guided by the guide unit 9 as described above is attached to the articulated robot 7. The guide mechanism 10 is attached to an arm 7a on a tip side in the articulated robot 7. The guide mechanism 10 includes a tow guide (not illustrated) provided for each of the fiber bundles 2 in order to individually guide each of the fiber bundles 2, and is configured so that each tow guide is supported by a support member 10a. The guide mechanism 10 is provided so that the support member 10a extends upward above the arm 7a and guides each of the fiber bundles 2 on a tip side of the support member 10a.

Therefore, in the automated fiber bundle placement device 1, the fiber bundle 2 pulled out from each of the bobbins 3 is pulled out from the supply device 4 (guide unit 9) at a position higher than that of the articulated robot 7 in an upward and downward direction. Thereafter, the fiber bundle 2 reaches the guide mechanism 10 in a form of passing above the articulated robot 7. Each of the fiber bundles 2 is turned into a form of being guided by the guide mechanism 10, and is guided to the placement head 6 attached to a tip of the arm 7a in the articulated robot 7.

Figure 2:
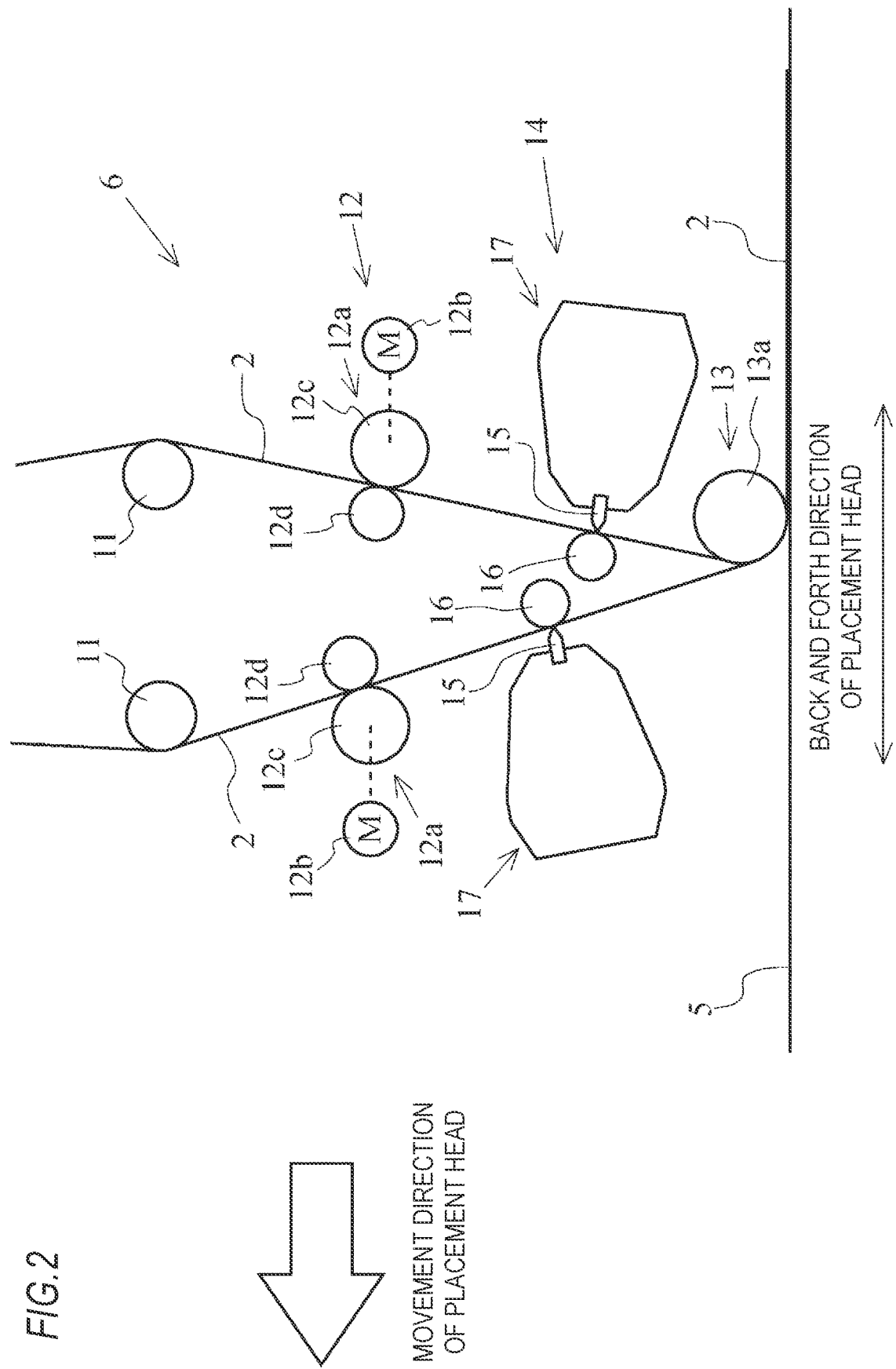
FIG. 2 is a schematic side elevation of a placement head illustrated in FIG. 1.

As illustrated in FIG. 2, the placement head 6 includes a pressing device 13 that presses the fiber bundle 2 onto the placement die 5, a feeding mechanism 12 that feeds the fiber bundle 2 toward the pressing device 13, and a cutting device 14 that cuts the fiber bundle 2 between the pressing device 13 and the feeding mechanism 12. In addition to the configuration elements, the placement head 6 includes a guide roller 11 provided above the feeding mechanism 12 to guide the fiber bundle 2 toward the feeding mechanism 12.

With regard to each of the configuration elements, the pressing device 13 includes a pressing unit 13a that presses the fiber bundle 2 onto the placement die 5 and a pressing mechanism (not illustrated) that causes the pressing unit 3a to generate a pressing force toward the placement die 5. The pressing unit 13a is a member common to each of the fiber bundles 2, and is a so-called compaction roller which is a roller-shaped member provided to be rotatable in the present embodiment.

The guide roller 11 is provided in a form where an axial direction thereof coincides with an axial direction of the pressing unit (compaction roller) 13a. In the present embodiment, in order to divide the 16 fiber bundles 2 guided to the placement head 6 as described above into two groups, two guide rollers 11 are provided at different positions in a back and forth direction of the placement head 6 (direction coinciding with a direction in which the fiber bundle 2 is placed on the placement die 5 in association with the placement). Each of the fiber bundles 2 is divided and guided by any one of the guide rollers 11. In this manner, the 16 fiber bundles 2 are divided into the two groups inside the placement head 6, and each of the groups is guided to the guide rollers 11 at the different positions in the back and forth direction so that each of the groups reaches the pressing unit 13a.

Each of the groups of the fiber bundles 2 is formed of the eight fiber bundles 2 as a result of equally dividing the 16 fiber bundles 2. Therefore, a route for the 16 fiber bundles 2 is a route for the eight fiber bundles 2 at two positions different in the back and forth direction. The route for each of the fiber bundles 2 inside the placement head 6 reaches the pressing unit 13a common to each of the fiber bundles 2 by way of the guide roller 11 to which the fiber bundle 2 corresponds.

With regard to the position of each of the fiber bundles 2 in the axial direction, the eight fiber bundles 2 in each group of the fiber bundles 2 are guided to be aligned with each other with a width interval of the fiber bundle 2 in the axial direction in the corresponding guide roller 11. Each of the fiber bundles 2 in one group and each of the fiber bundles 2 in the other group are guided by shifting the positions as much as the width of the fiber bundle 2 in the axial direction. In this manner, the 16 fiber bundles 2 are aligned with each other in the pressing unit 13a without any gap in the axial direction.

The feeding mechanism 12 has a feeding mechanism 12a provided for each route of the fiber bundle 2 and a driving motor 12b provided for each feeding mechanism 12a to rotationally drive the feeding mechanism 12a. In the present embodiment, each of the feeding mechanisms 12a is configured to include a pair of rollers 12c and 12d provided to nip the fiber bundle 2. In each of the feeding mechanisms 12a, one of the pair of rollers 12c and 12d (roller 12c in the illustrated example) is rotationally driven by the driving motor 12b so that the other is driven to rotate. In this manner, each of the feeding mechanisms 12a feeds the fiber bundle 2 toward the pressing unit 13a in the pressing device 13.

Figure 3:
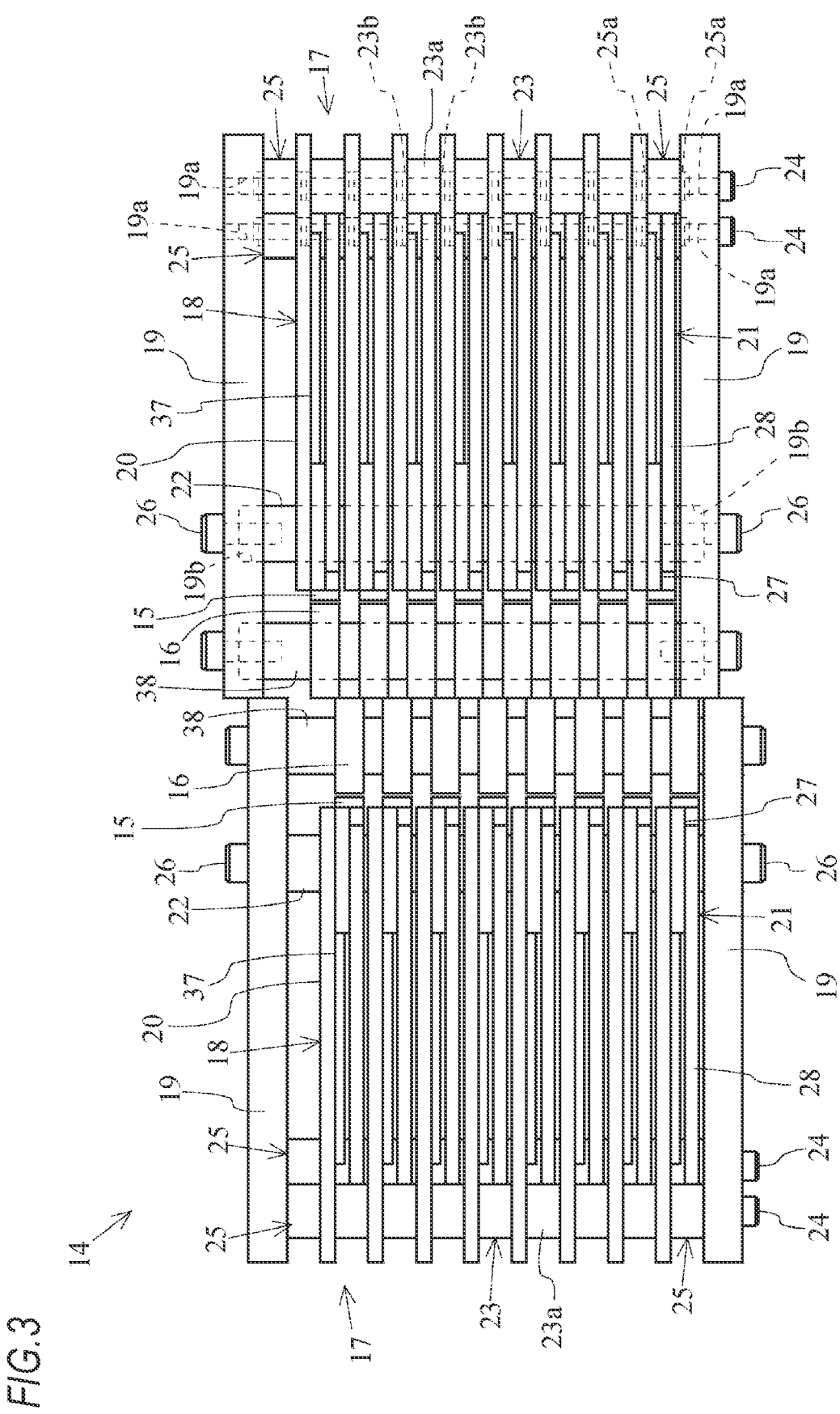
FIG. 3 is a schematic plan of a cutting device illustrated in FIG. 2.

The cutting device 14 includes a cutting blade 15 provided for each route of the fiber bundle 2, a securing member 16 provided to pinch the route with the cutting blade 15, and a drive mechanism 17 provided for each of the cutting blades 15 to perform a cutting operation for causing the cutting blade 15 to cut the fiber bundle 2. The cutting blade 15 is provided so that an extending direction of a blade line (blade edge) is parallel to the axial direction and substantially orthogonal to the traveling direction of the fiber bundle 2. In the present embodiment, the securing member 16 is a so-called anvil roller which is a roller-shaped member provided to be rotatable, and is provided for each of the cutting blades 15 as illustrated in FIG. 3. The cutting device 14 cuts the fiber bundle 2 in cooperation with the cutting blade 15 and the securing member 16 by causing the drive mechanism 17 to perform the cutting operation of the cutting blade 15.

In the automated fiber bundle placement device 1 configured as described above, in the present invention, each of the drive mechanisms 17 in the cutting device 14 is configured to mainly include the plate-shaped movable unit provided for each cutting blade 15, to which the corresponding cutting blade 15 is attached, and the support unit that supports the movable unit to be displaceable. In order to form the drive unit that displaces the movable unit with respect to the support unit, each of the drive mechanisms 17 is configured to include the permanent magnet provided on the support unit side, and the exciting coil provided on the movable unit side. However, in the present embodiment, each of the drive mechanisms 17 is configured so that the above-described cutting operation is performed by rocking displacement of the cutting blade 15. Therefore, the movable unit is supported to freely rock with respect to the support unit, and the support unit has a support shaft for supporting the movable unit.

Figure 4:
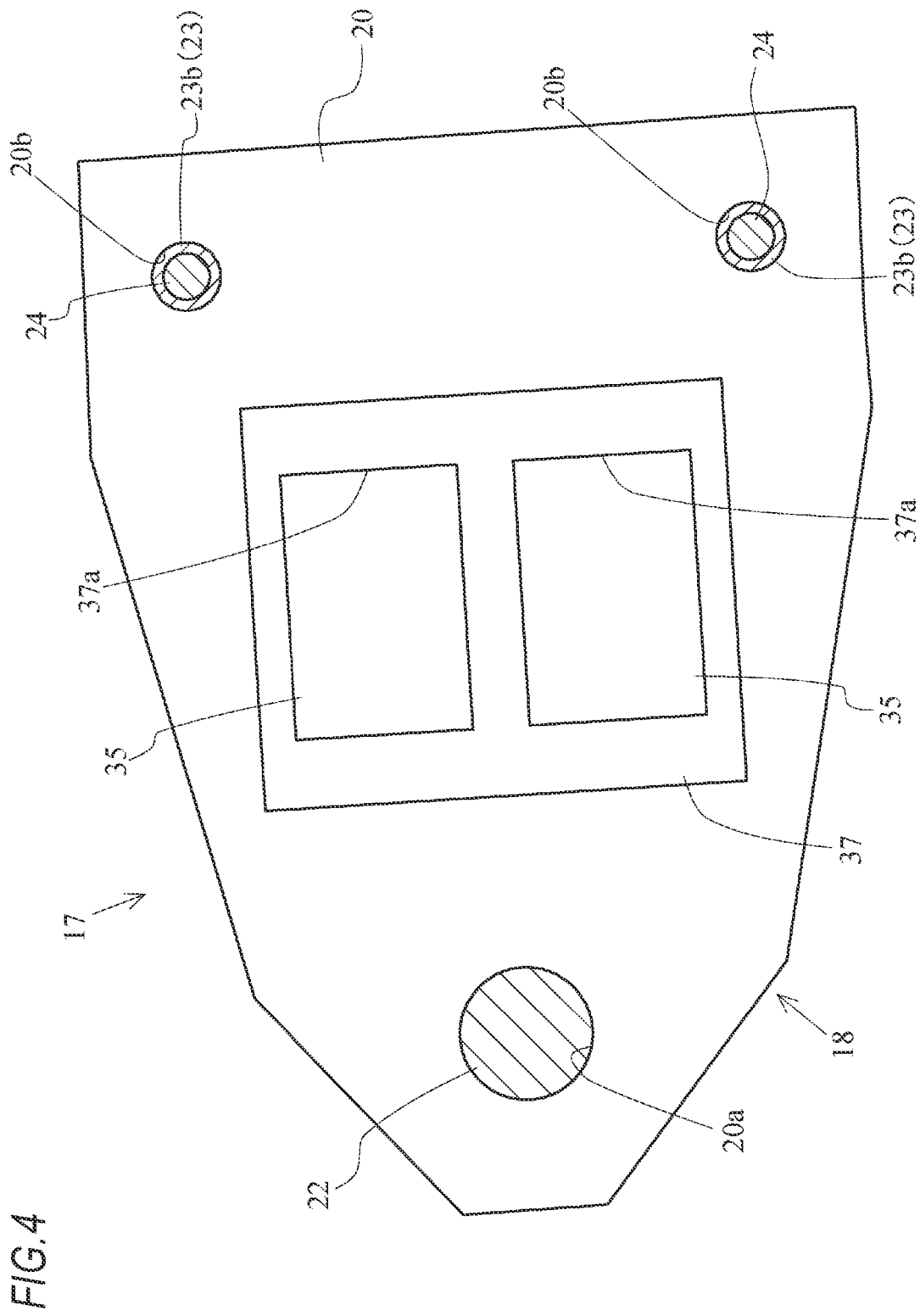
FIG. 4 is a side elevation of a support unit when the support unit of each drive mechanism in the cutting device illustrated in FIG. 3 is viewed from a side where a permanent magnet is provided in a plate thickness direction of a plate-shaped part thereof.
Figure 5:
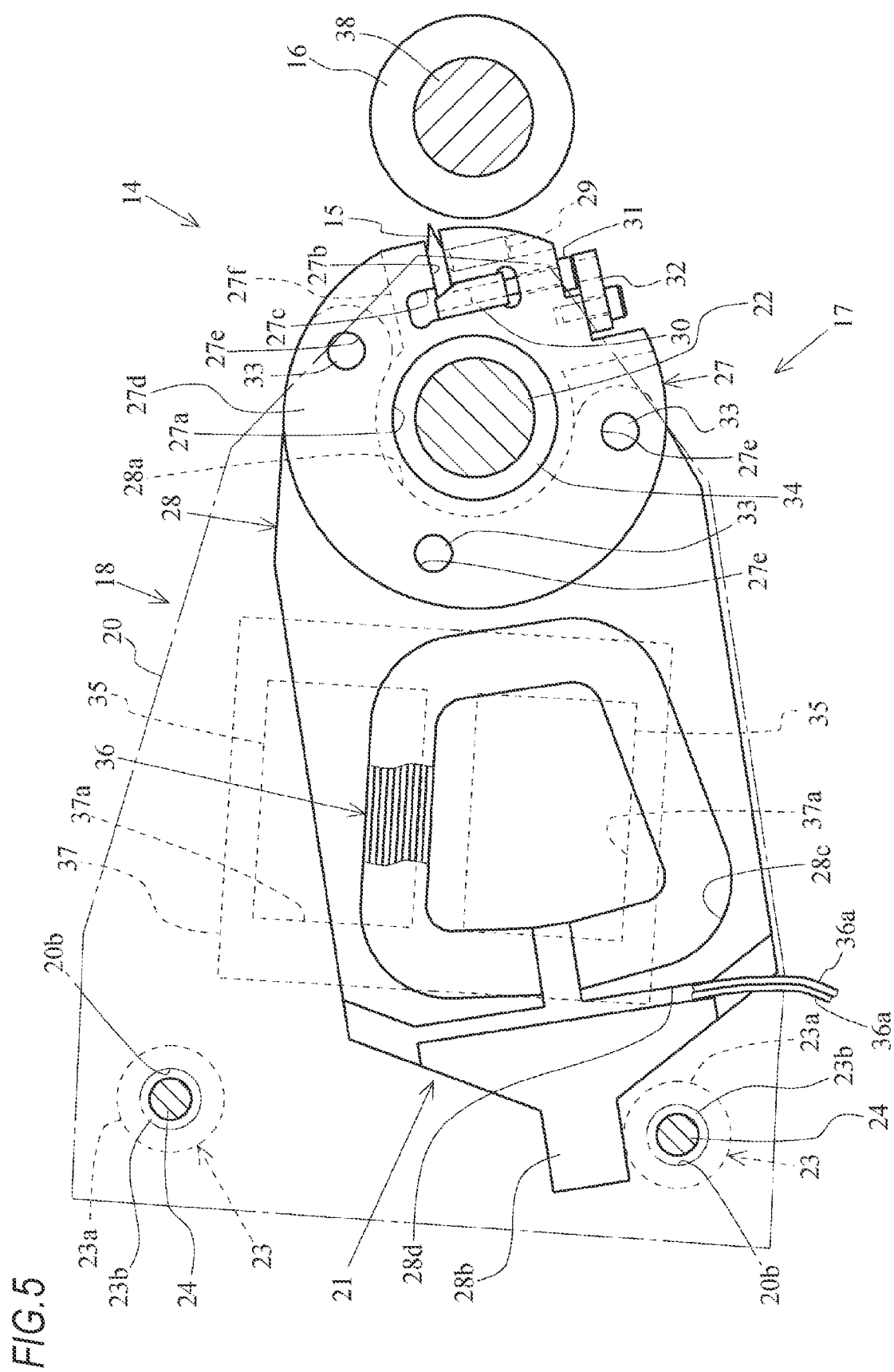
FIG. 5 is a side elevation of a movable unit when the movable unit of each drive mechanism in the cutting device illustrated in FIG. 3 is viewed from a side where an exciting coil is provided in a plate thickness direction thereof.
Figure 6:
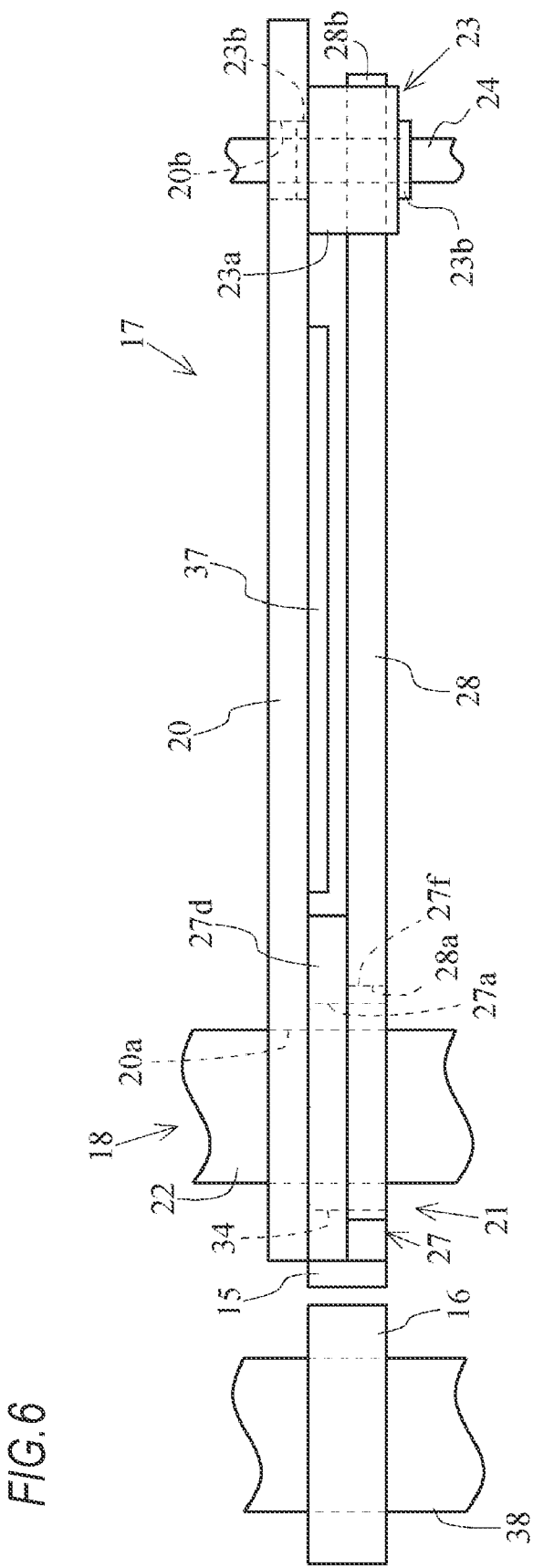
FIG. 6 is a plan illustrating one of a plurality of drive mechanisms in the cutting device illustrated in FIG. 3.

Hereinafter, a configuration of each of the drive mechanisms 17 will be described in detail with reference to FIGS. 4 to 6. As described above, in the present embodiment, the 16 fiber bundles 2 are divided into the two groups of the eight fiber bundles 2 at different positions in the back and forth direction inside the placement head 6. Therefore, the support unit and the movable unit in each of the drive mechanisms 17 are also divided into a set of the eight fiber bundles 2, and are provided corresponding to each group of the fiber bundles 2. However, with regard to the support shaft, one penetrating shaft is common to the eight support units and movable units in each set.

The support unit 18 is configured to mainly include a plate-shaped part 20, which is a part having a plate shape. The plate-shaped part 20 is generally formed in a substantially rectangular shape when viewed in a plate thickness direction thereof. However, more specifically, the plate-shaped part 20 is formed so that a dimension in a short side direction gradually decreases from one end side to the other end side in a long side direction when viewed in the plate thickness direction.

The plate-shaped part 20 has a through hole 20a penetrating in the plate thickness direction in a part on the other end side. With regard to the through hole 20a, the support unit 18 includes a support shaft 22 that supports the movable unit 21, and the through hole 20a is a hole into which the support shaft 22 is inserted. That is, as described above, in the present embodiment, the support shaft 22 is a penetrating shaft common to the eight support units 18 in each of the front and rear sets. Therefore, each of the plate-shaped parts 20 has the through hole 20a into which the support shaft 22 is inserted. In a state where the support shaft 22 is inserted into the through hole 20a and the plate-shaped part 20 and the support shaft 22 are combined with each other, each of the support unit 18 is in a form where the support shaft 22 protrudes from the plate-shaped part 20 in the plate thickness direction.

In addition to the through hole 20a described above, the plate-shaped part 20 has a through hole 20b penetrating in the plate thickness direction in a part on the one end side. The through holes 20b are holes used for attaching the support unit 18 (plate-shaped part 20) to a frame (not illustrated) in the placement head 6, and two through holes 20b are formed on the one end side. In each of the sets, the eight support units 18 (eight plate-shaped parts 20) are attached to the frame in a combined state.

More specifically, with regard to the combination and attachment, the eight support units 18 (eight plate-shaped parts 20) in each of the above-described sets are combined via a spacer 23. The spacer 23 is generally a member having a cylindrical shape, and includes a cylindrical interval defining portion 23a having a diameter larger than an inner diameter of the through hole 20b on the one end side, and connecting portions 23b and 23b protruding in a cylindrical shape from a central portion of both end faces of the interval defining portion 23a. The outer diameter of each connecting portion 23b substantially coincides with the inner diameter of the through hole 20b on the one end side, and a protrusion amount (protrusion length) from the end surface is formed to have a size equal to or smaller than half the thickness dimension of the plate-shaped part 20.

The eight plate-shaped parts 20 are combined in a state where the spacer 23 is pinched by two of the plate-shaped parts 20. In other words, the eight plate-shaped parts 20 are combined in a state where two plate-shaped parts 20 are located on both sides of each of the spacers 23. The spacer 23 is provided to correspond to the two through holes 20b and 20b on the one end side which are formed in each of the plate-shaped parts 20. Therefore, 14 spacers 23 are provided between the respective eight plate-shaped parts 20. Each of the spacers 23 is combined with both the plate-shaped parts 20 in a state of being placed between the two plate-shaped parts 20, and in a state where each of the connecting portions 23b is fitted into the through hole 20b on the one end side in each of the plate-shaped parts 20 on both sides. In this manner, the eight plate-shaped parts 20 are combined in a state of being mutually positioned at an interval by the interval defining portion 23a of the spacer 23.

The eight plate-shaped parts 20 combined in this way are brought into an integrally fixed state by a bracket 19 for attaching the support unit 18 to the frame and a screw member 24 that combines the bracket 19 and the support unit 18 (plate-shaped part 20) with each other.

The bracket 19 is a plate-shaped member having a thickness dimension larger than that of the plate-shaped part 20. The two brackets 19 are provided for each of the eight plate-shaped parts 20 combined as described above, and are combined with the set of the plate-shaped parts 20 in a form where the set of the plate-shaped parts 20 is pinched in the plate thickness direction. However, the plate-shaped part 20 and each of the brackets 19 are also combined with each other via a spacer 25 having a shape the same as that of the spacer 23 placed between the plate-shaped parts 20. Therefore, each of the brackets 19 has two through holes 19a and 19a formed at an interval the same as that of the two through holes 20b and 20b on the one end side in the plate-shaped part 20.

Although details will be described later, the support shaft 22 inserted into each of the plate-shaped parts 20 is supported by the brackets 19 and 19 in both ends thereof. Therefore, each of the brackets 19 also has a through hole 19b used for attaching the support shaft 22. That is, each of the brackets 19 has a size by which the two through holes 19a and 19a as described above and the through hole 19b for attaching the support shaft 22 can be formed when viewed in the plate thickness direction.

The respective spacers 23 and 25 have a hole into which the screw member 24 can be inserted. After both the brackets 19 and 19 are combined with the set of the plate-shaped parts 20 combined as described above via the spacer 25, the screw member 24 is inserted into each of the two through holes 19a and 19a in the bracket 19 from one side in the plate thickness direction, and a combined state thereof is fixed in a form where the screw member 24 is inserted into the hole of the respective spacers 23 and 25.

Therefore, the two through holes 19a and 19a in each of the brackets 19 are formed so that the inner diameter is changed (to internally have a step portion) in an intermediate portion in a penetrating direction. Specifically, the connecting portion 25a of the spacer 25 is fitted into a portion on the one end side (side located on the plate-shaped part 20 side in the combined state as described above) in each of the through holes 19a. Accordingly, the portion is formed to have the inner diameter corresponding thereto. The dimension of the portion in the penetrating direction is slightly larger than the protrusion amount of the connecting portion 25a. A portion on the other end side in each of the through holes 19a is formed to have a diameter smaller than that of the portion on the one end side. However, the portion on the other end side of each of the through holes 19a in one of the two brackets 19 and 19 is a normal hole, and is formed so that the inner diameter substantially coincides with the inner diameter of the hole of each of the spacers 23 and 25. In contrast, the portion on the other end side of each of the through holes 19a in the other bracket 19 is a female screw hole (female screw portion) into which the screw member 24 can be screwed.

The screw member 24 is inserted into the hole of the respective spacers 23 and 25 in a state where the set of the plate-shaped parts 20 and the bracket 19 are combined with each other via the spacers 23 and 25 as described above, and the screw member 24 is screwed into and fastened to the female screw portion of the through hole 19a in the other bracket 19. Accordingly, the set of the plate-shaped parts 20 is brought into a state of being pinched between the brackets 19 and 19 via the spacers 25 and 25. In this manner, the set of the plate-shaped parts 20 and both the brackets 19 and 19 are brought into an integrally combined state.

The support shaft 22 is supported by both the brackets 19 and 19 in a state of being inserted into each of the plate-shaped parts 20 as described above, and in a form where both end portions of the support shaft 22 are respectively inserted into through hole 19b for the support shaft of the bracket 19. The support shaft 22 is fixed to each of the brackets 19 by using a screw member 26 inserted from the outside into the through hole 19b for the support shaft in each of the brackets 19.

Therefore, the through hole 19b for the support shaft in each of the brackets 19 is also formed so that the inner diameter is changed (to internally have a step portion) in the intermediate portion in the penetrating direction. Specifically, one end side in the through hole 19b for the support shaft (side the same as the one end side of the through hole 19a) is formed to have a size by which the inner diameter substantially coincides with the diameter of the support shaft 22. In contrast, the portion on the other end side of the through hole 19b has the diameter smaller than that of the portion on the one end side, and is formed so that the inner diameter has a size by which the screw member 26 can be inserted into the inner diameter. The support shaft 22 has a female screw hole into which the screw member 26 can be screwed, which is a female screw hole open on both end surfaces thereof.

In a state where the support shaft 22 is inserted into the through hole 19b for the support shaft of each of the brackets 19 as described above, the screw member 26 is inserted into each of the through holes 19b from the other end side, and the screw member 26 is screwed into and fastened to the female screw hole in the support shaft 22. Accordingly, the support shaft 22 is brought into a state of being supported not to be relatively rotatable with respect to the brackets 19 and 19. In this manner, the support shaft 22 is brought into a state of being integrally combined with both the brackets 19 and 19 together with the set of the plate-shaped parts 20. That is, the support shaft 22 and the set of the eight plate-shaped parts 20 are brought into a state where the positions are relatively fixed via both the brackets 19 and 19, and are brought into a configuring state of the eight support units 18 in a form of being combined with both the brackets 19 and 19.

The set of the support units 18 (set of the plate-shaped parts 20) in each of the sets is attached to the frame in the placement head 6 via the respective brackets 19 in a state of being integrally fixed to both the brackets 19 and 19 as described above.

The movable unit 21 is configured to include a cutting blade support portion 27 which is a portion supported to be pivotable with respect to the support shaft 22 and is a portion to which the cutting blade 15 is attached, and a rocking drive portion 28 that causes the cutting blade support portion 27 to pivot. The cutting blade support portion 27 and the rocking drive portion 28 are formed of separate members, and the movable unit 21 is formed by combining both the members with each other.

The cutting blade support portion 27 is generally a disc-shaped member, and has a through hole 27a formed to penetrate in the plate thickness direction thereof. The through hole 27a is a hole for bringing the cutting blade support portion 27 (movable unit 21) into a state of being supported by the support shaft 22, and is formed to have a size into which the support shaft 22 can be inserted. The through hole 27a is formed at a position where the center of the through hole 27a coincides with the center of the cutting blade support portion 27 when viewed in the plate thickness direction of the cutting blade support portion 27.

The cutting blade support portion 27 is a member (portion) to which the cutting blade 15 is attached as described above. The cutting blade support portion 27 is configured to support the cutting blade 15 in a state of being accommodated in a groove formed to be open on the outer peripheral surface of the cutting blade support portion 27. Details of the configuration are as follows.

The cutting blade support portion 27 has an accommodation groove 27b as a groove for accommodating the cutting blade 15. The accommodation groove 27b is formed to be open on the outer peripheral surface of the cutting blade support portion 27 and to face the center side in the radial direction. The accommodation groove 27b is formed to be open on both end surfaces of the cutting blade support portion 27. However, an interval between two facing inner surfaces in the accommodation groove 27b substantially coincides with the thickness dimension of the cutting blade 15.

The cutting blade support portion 27 has a hole open on one side of the outer peripheral surface of the cutting blade support portion 27 and the two inner surfaces in the accommodation groove 27b, which is a hole drilled in a direction orthogonal to the inner surface of the accommodation groove 27b. The hole is a female screw hole in which a female screw is cut on the inner peripheral surface.

The cutting blade 15 is brought into a state of being accommodated in the accommodation groove 27b in a direction in which the blade edge is located on the outer peripheral surface side of the cutting blade support portion 27. In a state where the cutting blade 15 is accommodated in this way, a set screw 29 is screwed into the female screw hole described above. In this manner, the cutting blade 15 is fixedly placed inside the accommodation groove 27b, and the cutting blade 15 is brought into a state of being attached to the cutting blade support portion 27. The cutting blade 15 is provided so that the tip portion including the blade edge protrudes from the outer peripheral surface of the cutting blade support portion 27 in the attached state.

In the cutting device 14 of the present embodiment, the cutting blade support portion 27 is configured so that the protrusion amount of the cutting blade 15 from the outer peripheral surface can be adjusted. Specifically, the cutting blade support portion 27 has along hole 27c communicating with the accommodation groove 27b and penetrating in the plate thickness direction. The long hole 27c is formed to extend to both sides of the accommodation groove 27b in a direction orthogonal to the inner surface in the accommodation groove 27b. The cutting blade 15 has a such size that a rear end portion thereof is located in the long hole in a state where the tip portion is provided to protrude as described above.

The long hole 27c in the cutting blade support portion 27 accommodates a position adjustment member 30 for adjusting a position (protrusion amount) of the cutting blade 15. The position adjustment member 30 is a substantially rectangular parallelepiped member that can slide inside the long hole 27c. The position adjustment member 30 is provided to come into contact with the cutting blade 15 in a portion on the tip side of the position adjustment member 30 on a sliding surface on the cutting blade 15 side of two sliding surfaces. However, a portion on the tip side on the sliding surface is an inclined surface that is inclined to be separated toward the tip from the cutting blade 15 side. On the other hand, a rear end surface of the cutting blade 15 is an inclined surface that comes into contact with the inclined surface of the position adjustment member 30 (sliding surface). That is, both are in contact with each other on the inclined surface. According to the configuration, the position (protrusion amount) of the cutting blade 15 can be changed by changing the position of the position adjustment member 30.

A screw member 31 is used to change the position of the position adjustment member 30. The screw member 31 is inserted into a through hole formed in the cutting blade support portion 27 to cause the long hole 27c and the outside to communicate with each other, and is provided in a state of being screwed into a female screw hole formed in the position adjustment member 30. A plate member 32 for supporting the screw member 31 is attached to the cutting blade support portion 27. The screw member 31 is supported by the plate member 32 in a head portion, and is in a state where the position in the axial direction is fixed. In the configuration, the position of the position adjustment member 30 (protrusion amount of the cutting blade 15) is changed by rotating the screw member 31. When the protrusion amount of the cutting blade 15 is changed, the set screw 29 is loosened to bring the cutting blade 15 into a displaceable state.

The rocking drive portion 28 is formed of a plate-shaped member. When viewed in the plate thickness direction, the rocking drive portion 28 has a shape that has a substantially trapezoidal portion on both sides in the long side direction of the rectangular portion. However, one substantially trapezoidal portion on both sides has a cutout 28a open in an end edge in the long side direction and cut out in a substantially semicircular shape. The cutout 28a having the substantially semicircular shape is formed so that the inner diameter is smaller than the outer diameter of the cutting blade support portion 27 and is larger than the inner diameter of the through hole 27a of the cutting blade support portion 27.

The rocking drive portion 28 is attached to the cutting blade support portion 27 in a form where the center of the cutout 28a coincides with the center of the cutting blade support portion 27 (through hole 27a) when viewed in the plate thickness direction. However, an attachment portion 27d as a portion to which the rocking drive portion 28 is attached in the cutting blade support portion 27 is a portion including a portion overlapping the rocking drive portion 28 when viewed in the plate thickness direction, and a portion excluding the portion where the accommodation groove 27b and the long hole 27c are formed.

The cutting blade support portion 27 is formed so that one of both end surfaces in the plate thickness direction is a flat surface and the thickness dimension of the portion of the attachment portion 27d is smaller than the other thickness dimensions. That is, the other end surface is a surface having a step portion 27f between the surface (attachment surface) of the attachment portion 27d and the surface on the cutting blade 15 side other than the attachment portion 27d. However, a step difference has a size that substantially coincides with the thickness dimension of the rocking drive portion 28. Therefore, the end surface opposite to the attachment surface in the rocking drive portion 28 and the surface on the cutting blade 15 side in the cutting blade support portion 27 are substantially flush with each other in a state where the rocking drive portion 28 is attached to the cutting blade support portion 27 as described above.

The rocking drive portion 28 is attached to the cutting blade support portion 27 (attachment portion 27d) by using a screw member 33. More specifically, the screw member 33 is inserted into each of through holes (not illustrated) formed at three locations in the rocking drive portion 28, and each of the screw members 33 is screwed into a female screw hole 27e formed in the attachment portion 27d in the cutting blade support portion 27. In this manner, the rocking drive portion 28 is attached to the cutting blade support portion 27.

Each of the drive mechanisms 17 is configured in a form where the movable unit 21 configured in this way is supported by the corresponding support unit 18. As described above, the support shaft 22 is a common shaft for the respective support units 18 in each of the sets. The movable unit 21 is supported by the corresponding support unit 18 in a state of facing the one end surface of the cutting blade support portion 27. Therefore, in each of the support units 18, the portion of the support shaft 22 protruding from the plate-shaped part 20 to the side for supporting the movable unit 21 is a spindle portion for supporting the movable unit 21.

In each of the drive mechanisms 17, the movable unit 21 is supported to be pivotable with respect to the spindle portion in the corresponding support unit 18 via a bearing 34 fitted into the through hole 27a in the cutting blade support portion 27. In each of the drive mechanisms 17, in the movable unit 21 supported in this way, the one end surface of the cutting blade support portion 27 is in contact with the plate-shaped part 20 of the support unit 18. Therefore, in order to reduce sliding resistance generated when the movable unit 21 pivots (rocks) with respect to the support unit 18, a plate material (not illustrated) formed of a material having a low coefficient of friction is interposed between the cutting blade support portion 27 in the movable unit 21 and the plate-shaped part 20 in the support unit 18.

The support shaft 22 including each of the spindle portions is the common penetrating shaft as described above. Accordingly, each of the drive mechanisms 17 is in a state of being integrally combined with the brackets 19 and 19 by the support shaft 22. In the combined state, the respective drive mechanisms 17 in each of the sets are in a state of being aligned with each other in the axial direction of the support shaft 22. In the aligned state, the interval between the plate-shaped parts 20 in the support unit 18 is fixed by the spacer 23 as described above. In contrast, in order to avoid sliding contact with the support unit 18 (plate-shaped part 20) in the adjacent drive mechanism 17, each of the movable units 21 is formed so that the dimension in the plate thickness direction is smaller than the interval between the plate-shaped parts 20. On the support shaft 22, a spacer (not illustrated) for fixing the interval between the movable unit 21 and the plate-shaped part 20 is interposed between the movable unit 21 and the plate-shaped part 20 in the adjacent drive mechanism 17. The spacer is the same as the plate material formed of the material having the low coefficient of friction.

In a state where the respective drive mechanisms 17 in each of the sets are aligned with each other as described above, the drive mechanism 17 on one end side in the two drive mechanisms 17 and 17 located in both ends in the alignment direction thereof faces the bracket 19 on the movable unit 21 side. Therefore, a spacer the same as the spacer interposed between the movable unit 21 and the plate-shaped part 20 as described above is also interposed between the movable unit 21 and the bracket 19.

Each of the drive mechanisms 17 is configured so that the pivoting (rocking) of the movable unit 21 is restricted by the above-described spacer 23. Specifically, each of the movable units 21 has an engagement portion 28b protruding from the other portion in the long side direction, in the other portions (portions on the side opposite to the cutout 28a) having the substantially trapezoidal shape on both sides in the long side direction of the rocking drive portion 28.

In each of the drive mechanisms 17 excluding the drive mechanism 17 on the one end side, in a state where the movable unit 21 is supported by the support unit 18 as described above, the movable unit 21 is located between the two spacers 23 and 23 where the engagement portion 28b is located on the spindle portion side with respect to each of the plate-shaped parts 20 when viewed in the plate thickness direction. The movable unit 21 in the drive mechanism 17 on the one end side is located between the two spacers 25 and 25 where engagement portion 28b is located between the plate-shaped part 20 and the bracket 19 in the drive mechanism 17. Therefore, each of the drive mechanisms 17 has a configuration in which the pivoting (rocking) of the movable unit 21 is restricted by each of the spacers 23 and 25. For this reason, each of the spacers 23 and 25 also functions as a part of the drive mechanism 17.

Each of the drive mechanisms 17 includes a permanent magnet 35 provided on the support unit 18 side and an exciting coil 36 provided on the movable unit 21 side, as a configuration for displacing (rocking) the movable unit 21 with respect to the support unit 18. The permanent magnet 35 is a plate-shaped magnet, and has a rectangular shape when viewed in the plate thickness direction. However, the permanent magnet 35 is formed so that a magnetization direction is the plate thickness direction, and both end surfaces in the plate thickness direction are magnetic poles. Two permanent magnets 35 each are attached to end surfaces on the movable unit 21 side of the plate-shaped part 20 in the support unit 18. However, in the drive mechanism 17 of the present embodiment, the two permanent magnets 35 and 35 are attached to the plate-shaped part 20 via an attachment plate 37.

The attachment plate 37 is a plate-shaped member having the plate thickness thicker than that of the permanent magnet 35. The two permanent magnets 35 and 35 are attached to one end surface of the attachment plate 37 by adhesion in aligned placement manner having an interval therebetween. However, both the permanent magnets 35 and 35 are attached to the attachment plate 37 in a state where the magnetization directions are opposite to each other.

The attachment plate 37 has a concave portion 37a having a size into which the permanent magnet 35 is fitted, at an attachment position of each of the permanent magnets 35. A depth of the concave portion 37a substantially coincides with the plate thickness of the permanent magnet 35. Each of the permanent magnets 35 is attached to the attachment plate 37 in a form of being fitted into the concave portion 37a. Therefore, in the attached state, an end surface on the side opposite to the attachment plate 37 side in each of the permanent magnets 35 and a portion excluding the concave portion 37a on the one end surface in the attachment plate 37 are substantially flush with each other. That is, in the attached state, each of the permanent magnets 35 is in a state where only one end surface is exposed to the attachment plate 37. The exposed end surfaces of both the permanent magnets 35 and 35 are magnetic pole surfaces different from each other.

The two permanent magnets 35 and 35 are brought into a state of being attached to the support unit 18 (plate-shaped part 20) by attaching the attachment plate 37 to the end surface of the plate-shaped part 20. The attachment plate 37 is attached to the plate-shaped part 20 by using a screw member (not illustrated). The attachment is performed so that the alignment direction of the two permanent magnets 35 and 35 is substantially parallel to the short side direction of the plate-shaped part 20.

However, in the short side direction of the plate-shaped part 20 (alignment direction of the permanent magnets 35 and 35), the attachment position is a position where an intermediate position between the two permanent magnets 35 and 35 (intermediate position of the portion between both the two permanent magnets 35 and 35) substantially coincides with an intermediate position between the two through holes 20b and 20b on the one end side in the plate-shaped part 20 (intermediate position of the portion between both the through holes 20b and 20b). The attachment position is a position where both the permanent magnets 35 and 35 are located between the cutting blade support portion 27 and the spacer 23 (25) of the movable unit 21 in the drive mechanism 17 in the long side direction of the plate-shaped part 20.

In the movable unit 21, the rocking drive portion 28 is attached to the cutting blade support portion 27 as described above. In this manner, the movable unit 21 is configured so that the cutting blade support portion 27 protrudes from the rocking drive portion 28 by the thickness dimension of the attachment portion 27d in the plate thickness direction. Therefore, in each of the drive mechanisms 17, as described above, the movable unit 21 is in a state where the one end surface of the cutting blade support portion 27 is in contact with the plate-shaped part 20. Accordingly, a gap corresponding to the thickness dimension of the attachment portion 27d in the cutting blade support portion 27 in the plate thickness direction exists between the plate-shaped part 20 and the rocking drive portion 28 in the movable unit 21.

The attachment plate 37 is attached to the plate-shaped part 20 at the above-described position. Accordingly, in a state where the movable unit 21 and the plate-shaped part 20 are combined with each other, the attachment plate 37 is in a state of being placed in the gap between the plate-shaped part 20 and the rocking drive portion 28. Therefore, the thickness dimension of the attachment plate 37 is smaller than the size of the gap so that the attachment plate 37 is allowed to be placed in the gap. Moreover, the thickness dimension is set to such an extent that the attachment plate 37 (permanent magnets 35 and 35) does not come into sliding contact with the rocking drive portion 28.

The exciting coil 36 is a flat plate-shaped coil around which a conducting wire is wound in a flat plate shape (flat shape), and is formed to have a substantially trapezoidal shape in a plan view. The exciting coil 36 is attached to the end surface on the attachment surface side of the rocking drive portion 28 of the movable unit 21 by adhesion. An annular groove (annular groove) 28c conforming to a shape (size) of the exciting coil 36 is formed at the attachment position of the exciting coil 36 in the rocking drive portion 28. The exciting coil 36 is attached to the rocking drive portion 28 of the movable unit 21 in a form of being accommodated in the annular groove 28c. The exciting coil 36 is connected to an exciting circuit (not illustrated) by conducting wire portions 36a and 36a extending from both ends of a winding portion. Therefore, the rocking drive portion 28 has a groove 28d accommodating the conducting wire portions 36a and 36a so that the outside of the rocking drive portion 28 and the annular groove 28c communicate with each other when viewed in the plate thickness direction.

In each of the drive mechanisms 17, the movable unit 21 is supported by the support unit 18 in the above-described form. Accordingly, the permanent magnets 35 and 35 attached to the plate-shaped part 20 in the support unit 18 and the exciting coil 36 attached to the rocking drive portion 28 in the movable unit 21 are brought into a state where both are provided to face each other in the plate thickness direction.

According to the respective drive mechanisms 17 configured as described above, the exciting coil 36 on the movable unit 21 side is excited by energizing, thereby generating a magnetic field in a direction corresponding to an energizing direction. The movable unit 21 is driven to rock to be displaced in a direction corresponding to a direction of the magnetic field with respect to the support unit 18 to which the permanent magnets 35 and 35 are attached in a form of having a different magnetic pole. However, in a state where the movable unit 21 is supported by the support unit 18, the engagement portion 28b of the rocking drive portion 28 in the movable unit 21 is located between the two spacers 23 and 23 (or between the two spacers 25 and 25). Accordingly, the displacement associated with the rocking drive is restricted by the spacer 23 (or the spacer 25). In other words, a rocking limit associated with the rocking drive is defined by the spacer 23 (or the spacer 25).

As described above, on the support unit 18 side, the two permanent magnets 35 and 35 are attached to the plate-shaped part 20 so that the intermediate position of the permanent magnets 35 and 35 substantially coincides with the intermediate position of the through holes 20b and 20b on the one end side of the plate-shaped part 20 in the short side direction of the plate-shaped part 20. Therefore, the intermediate position of the permanent magnets 35 and 35 substantially coincides with the intermediate position of the two spacers 23 and 23 (or the two spacers 25 and 25) that define the rocking limit as described above (intermediate position of the portion between both the spacers 23 and 23 (spacers 25 and 25).

In this manner, in a state (rocking-restricted state) where the movable unit 21 is in contact with one of the two spacers 23 and 23 (or the spacers 25 and 25) in the engagement portion 28b, the energizing direction to the exciting coil 36 is switched to reverse a displacement direction (rocking direction). Accordingly, the movable unit 21 is driven to rock to be displaced toward the other spacer 23 (or the spacer 25) side. The energizing directions are repeatedly switched in accordance with a preset cutting timing. In this manner, the movable unit 21 is driven to rock to reciprocate within a range of the two spacers 23 and 23 (or spacers 25 and 25).

As a result, the cutting blade 15 attached to the movable unit 21 is driven to rock to reciprocate by reciprocating rocking between a position where the cutting blade 15 comes into contact with one spacer 23 (or the spacer 25) of the movable unit 21 and a position where the cutting blade 15 comes into contact with the other spacer 23 (or the spacer 25). In this manner, the above-described cutting operation is performed. In other words, the movable unit 21 is driven as described above. Accordingly, the cutting blade 15 is driven to rock to reciprocate between a cutting position for cutting the fiber bundle 2 and a retreating position separated from the fiber bundle 2.

The cutting operation is performed in cooperation with the cutting blade 15 and the securing member 16 as described above. The cutting device 14 has an anvil roller 16 as the securing member provided to pinch the route of the fiber bundle 2 with the cutting blade 15. The anvil roller 16 is provided for each of the cutting blades 15 as described above. Therefore, eight anvil rollers 16 are provided for each of the above sets including the eight movable units 21 to which the cutting blades 15 are attached. The eight anvil rollers 16 are supported to be rotatable with respect to a common shaft 38. The shaft 38 is supported by the pair of brackets 19 and 19 as in the support shaft 22. The support position of each of the anvil rollers 16 is a position where the cutting blade 15 driven to rock as described above comes into contact with the outer peripheral surface above a height position of an axial center of the anvil roller 16 in the upward and downward direction.

In the cutting operation, as the cutting blade 15 is driven to rock from the retreating position toward the cutting position, the fiber bundle 2 passing between the anvil roller 16 and the cutting blade 15 is first brought into a state of being pinched (nipped) between the anvil roller 16 and the cutting blade 15. When the fiber bundle 2 is cut, a pressing force needs to be applied to the fiber bundle 2 to some extent by the cutting blade 15 in the nipped state. The position of the anvil roller 16 in the upward and downward direction is the above-described position. Accordingly, even when the anvil roller 16 rotates and the cutting blade 15 rocks in the initially nipped state, a pinched state of the fiber bundle 2 is maintained up to a rocking angle at which the cutting blade 15 reaches the position closest to the movable unit 21 on the peripheral surface of the anvil roller 16. The fiber bundle 2 is cut until the cutting blade 15 reaches the rocking angle.

In this way, in the cutting device 14 of the present embodiment, in a state where the fiber bundle 2 is nipped between the anvil roller 16 and the cutting blade 15, the cutting is performed while the nipping position of the fiber bundle 2 on the peripheral surface of the anvil roller 16 is changed in the circumferential direction of the anvil roller 16. In this manner, in the cutting device 14, the fiber bundle 2 can be cut without causing the feeding mechanism 12 to stop the feeding of the fiber bundle 2 toward the pressing unit 13a in the pressing device 13.

According to the cutting device 14 including each of the drive mechanisms 17 configured as described above, the drive unit for rocking the movable unit 21 to which the cutting blade 15 is attached is configured so that the permanent magnets 35 and the exciting coils 36 which are respectively formed in a flat plate shape are placed to face each other. Therefore, in terms of dimensions occupied by an existence range thereof, the drive unit itself is sufficiently smaller in the thickness direction (facing direction) than the drive unit using the piston in the related art.

With regard to the permanent magnet 35 and the exciting coil 36 which form the drive unit, the exciting coil 36 is accommodated (incorporated) in the rocking drive portion 28 in the movable unit 21, and is provided not to occupy the placement space. The permanent magnet 35 is attached to the plate-shaped part 20 of the support unit 18, and the plate-shaped part 20 is placed to face the movable unit 21 (rocking drive portion 28). In this manner, the permanent magnet 35 is provided in a state of facing the exciting coil 36. The plate-shaped part 20 for placing the permanent magnet 35 in this way is attached in a form where the permanent magnet 35 is fitted to (incorporated in) the plate-shaped part 20. The plate-shaped part 20 has the thickness dimension slightly larger than the thickness dimension of the permanent magnet 35.

Each of the drive mechanisms 17 is configured in a form where the plate-shaped part 20 for placing the permanent magnet 35 is placed to face the movable unit 21 to which the cutting blade 15 is attached and accommodating the exciting coil 36. Therefore, the dimension in the thickness direction of the movable unit 21 of each the drive mechanisms 17 is approximately obtained by adding the thickness dimension of the plate-shaped part 20 to the thickness dimension of the movable unit 21. In the cutting device 14, the drive mechanisms 17 configured in this way are aligned with each other in the thickness direction of the movable unit 21. However, the placement interval of the movable units 21 (cutting blades 15) in the alignment direction is small to such an extent that the adjacent movable units 21 have an interval corresponding to the thickness dimension of the plate-shaped part 20. In this manner, the plurality of fiber bundles 2 can be placed without any gap, and the cutting device 14 can correspond to the narrow fiber bundle 2.

The present invention is not limited to the embodiments described above, and can also be implemented in modified aspects (modification example) as described in (1) to (6) below.

(1) With regard to the drive mechanism, in the above-described embodiment, the permanent magnet 35 is provided on the support unit 18 side, and the exciting coil 36 is provided on the movable unit 21 side. However, in the drive mechanism of the present invention, the permanent magnet may be provided on the movable unit side, and the exciting coil may be provided on the support unit side.

In the above-described embodiment, the permanent magnet 35 and the exciting coil 36 which are included in the drive mechanism 17 have two permanent magnets 35 and one exciting coil 36. However, in the present invention, the number of the permanent magnets and the exciting coils is not limited to the number in the above-described embodiment. For example, one permanent magnet and two exciting coils can be used. In this case, for example, the movable unit may be driven to reciprocate by alternately switching between an excited state where one of the two exciting coils is excited and the other is not excited and an excited state where one is not excited and the other is excited.

The permanent magnet is formed so that the magnetization direction is orthogonal to the plate thickness direction, and the permanent magnet is attached to the plate-shaped part so that the magnetization direction is substantially parallel to the short side direction of the plate-shaped part. However, the attachment position of the plate-shaped part is a position where the intermediate position in the magnetization direction of the permanent magnet substantially coincides with the intermediate position of the two through holes on the one end side in the plate-shaped part in the short side direction of the plate-shaped part. According to the configuration, one permanent magnet and one exciting coil can be respectively used.

In the above-described embodiment, the permanent magnet 35 is indirectly attached to the plate-shaped part 20 via the attachment plate 37, and the exciting coil 36 is directly attached to the movable unit 21. However, in the drive mechanism of the present invention, the permanent magnet may be directly attached to the plate-shaped part (movable unit) without using the attachment plate. In this case, the plate-shaped part (movable unit) may have the concave portion formed as in the attachment plate 37 of the above-described embodiment, and the permanent magnet may be provided in a form of being incorporated in the concave portion. Alternatively, the permanent magnet may be provided in a form of protruding from the end surface of the plate-shaped part (movable unit). The exciting coil may be indirectly attached to the movable unit (plate-shaped part) via the attachment plate. In this case, an annular groove may be formed in the attachment plate instead of the concave portion, and the exciting coil may be provided in a form of being incorporated in the annular groove of the attachment plate.

(2) With regard to the drive mechanism, in the above-described embodiment, the drive mechanism 17 for displacing the cutting blade 15 toward the cutting position is configured so that the movable unit 21 to which the cutting blade 15 is attached is driven to rock to rock with respect to the support unit 18. However, in the present invention, the drive mechanism can be configured so that the movable unit is linearly displaced toward the cutting position. As the configuration of the drive mechanism, for example, a configuration illustrated in FIG. 7 is conceivable.

Figure 7:
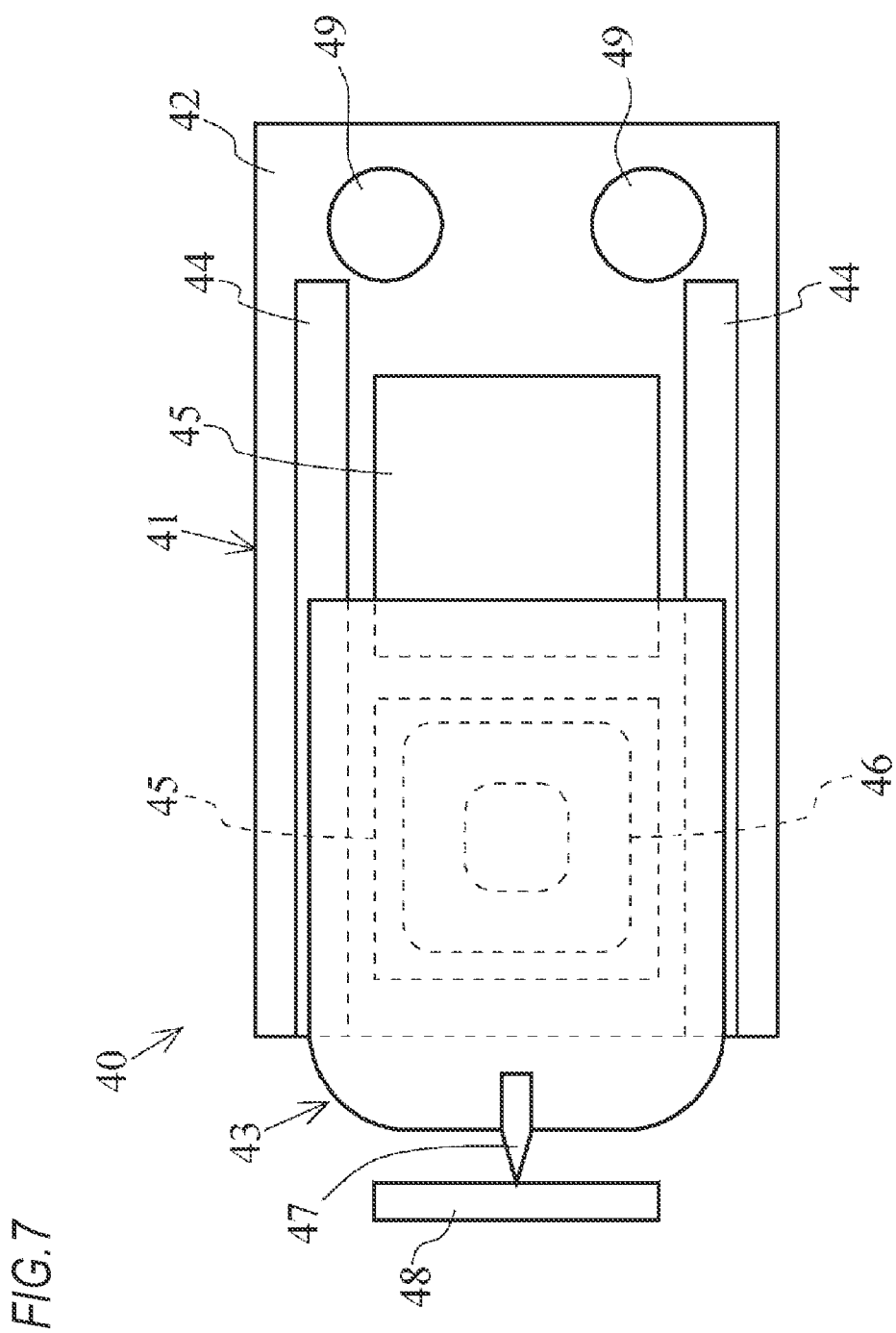
FIG. 7 is a schematic side elevation illustrating an example of a drive mechanism configured so that a movable unit can be linearly driven.

In FIG. 7, the support unit 41 in the drive mechanism 40 has a pair of guides 44 and 44 extending in parallel on one plate surface of the plate-shaped part 42. In the illustrated example, the movable unit 43 is formed of a single member. The movable unit 43 is provided between both the guides 44 and 44 to face the one plate surface of the plate-shaped part 42 on an end surface thereof. The movable unit 43 comes into contact with both the guides 44 and 44, and is slidable in the extending direction of the guide 44.

The two permanent magnets 45 and 45 are attached to the plate-shaped part 42 in a form of being aligned with each other in the extending direction of the guide 44. The two permanent magnets 45, 45 are provided in a form of being incorporated in the plate-shaped part 42 so that only the magnetic pole surface is exposed on the one plate surface, and the magnetic pole on the exposed surface is different as in the above-described embodiment. The exciting coil 46 is attached to the movable unit 43 in an incorporated form as in the above-described embodiment. Therefore, the movable unit 43 is placed for the support unit 41 as described above. In this manner, the permanent magnet 45 and the exciting coil 46 are in a state of facing each other. In this manner, the drive mechanism 40 has a configuration in which the movable unit 43 can be linearly driven to linearly displace the movable unit 43 in the extending direction of the guide 44.

Each of the drive mechanisms 40 configured in this way is provided on the cutting device in a direction where the cutting blade 47 attached to the movable unit 43 faces the securing member 48. For example, as in the above-described embodiment, the respective drive mechanisms 40 are supported in the plate-shaped part 42 via the support shaft (screw member) and the spacers 49 and 49, and are aligned with each other in a state where the interval between the adjacent drive mechanisms 40 is defined by the spacers 49 and 49. However, as the position of the spacers 49 and 49, both the spacers 49 and 49 are located between the pair of guides 44 and 44 when viewed in the plate thickness direction of the plate-shaped part 42. In this manner, a retreating limit in a retreating direction from the cutting position is defined by the spacers 49 and 49.

The exciting coil 46 is excited by energizing, and the energizing directions are switched. In this manner, the movable unit 43 is linearly driven to reciprocate between the cutting position where the cutting blade 47 comes into contact with the securing member 48 and the retreating limit (retreating position).

(3) With regard to the movable unit in the drive mechanism, in the example described above, the movable unit is configured to function as an integrally operated member that is a single body to which the cutting blade is attached. However, in the drive mechanism of the present invention, the movable unit may include two members provided in a form of having different displacement directions, such as a member to which the exciting coil or the permanent magnet is attached and a member to which the cutting blade is attached. The movable unit may be configured so that both the members are connected to each other by a mechanism that transmits driving.

Specifically, for example, as in the movable unit 43 of the example illustrated in FIG. 7, the member to which the cutting blade is attached (cutting blade support member) may be provided to be linearly displaced toward the securing member. A member (rocking member) supported to rock in a displacement direction is provided on a side opposite to the securing member side in a direction of the displacement (displacement direction) with respect to the cutting blade support member. The rocking member may be configured to be driven to rock within a predetermined rocking range by the permanent magnet or the exciting coil which are provided between the support unit and the rocking member. The rocking member and the cutting blade support member may be connected to each other by a connecting member such as a link. In this manner, a configuration may be adopted so that the cutting blade support member is linearly displaced as the rocking member is driven to rock.

(4) With regard to the drive mechanism, in the example described above, the drive mechanism is configured so that both forward movement and rearward movement of the movable unit driven to reciprocate are performed by controlling the excitation of the exciting coil. However, the drive mechanism of the present invention may be configured so that one of the forward movement and the rearward movement of the movable unit is electrically performed by the excitation of the exciting coil, and the other is mechanically performed by a spring.

For example, in the drive mechanism in which the support unit and the movable unit are configured as in the above-described embodiment, there is provided a spring member such as a coil spring that biases the movable unit in one direction of reciprocating rocking with respect to the support unit. In the spring member, one end is connected to the support unit (plate-shaped part), and the other end is connected to the movable unit. The drive mechanism is maintained in a state where the movable unit is in contact with one of the two spacers by a biasing force (spring force) of the spring member, and the exciting coil is excited. In this manner, the drive mechanism may be configured so that the drive unit rocks up to a position where the movable unit comes into contact with the other spacer against the spring force.

(5) With regard to the support unit in the drive mechanism, in the above-described embodiment, the plate-shaped part 20 in each of the support units 18 is formed as a separate member, and in each of the sets, the plurality of plate-shaped parts 20 are combined with each other via the spacer 23. However, in the present invention, the plurality of plate-shaped parts brought into an aligned state by being provided in the plurality of aligned drive mechanisms are not limited to those respectively formed as separate members as in the above-described embodiment.

For example, in the configuration of the embodiment, each of the sets in the embodiment includes the eight plate-shaped parts formed as separate members and the 14 spacers placed between the respective plate-shaped parts. However, a single member may be formed so that the plate-shaped part and the spacer are integrated with each other. The member may be provided on the cutting device so that a part corresponding to the plate-shaped part functions as the plate-shaped part in the above-described embodiment. A single member may be formed so that the support shaft in the above-described embodiment and the plurality of plate-shaped parts into which the support shaft is inserted are integrated with each other, and a configuration may be adopted in which the plurality of aligned support units are integrated with each other.

In the above-described embodiment, the support unit 18 is configured as follows. A portion of the support shaft 22 common to the plurality of support units 18 aligned in each of the sets serves as the spindle portion for supporting the movable unit 21 in each of the support units 18. In other words, the spindle portion in each of the support units 18 serves as a portion of a single shaft provided to be common to the plurality of aligned support units 18. However, in the present invention, even when the drive mechanism is configured so that the movable unit is supported to be capable of rocking with respect to the support unit, the spindle portion in the support unit supporting the movable unit may be provided for each support unit (independently).

Specifically, for example, in the configuration of the embodiment, the support shaft 22 may be omitted. Alternatively, the plate-shaped part may be formed to have a protruding portion having a shape functioning as the above-described spindle portion in a portion supporting the movable unit 21. Alternatively, a shaft member formed separately from the plate-shaped part and functioning as a spindle portion may be attached to the plate-shaped part.

(6) With regard to the route of the fiber bundle in the placement head, in the above-described embodiment, the placement head 6 is configured so that the route of the 16 fiber bundles 2 is divided into two different positions in the back and forth direction of the placement head 6. That is, the placement head 6 of the above-described embodiment is configured as follows. A large number of the fiber bundles 2 are placed, and the route of the fiber bundles 2 inside the placement head 6 is divided into a plurality of routes in the back and forth direction in relation to the number of the fiber bundles 2. However, in the automated fiber bundle placement device of the present invention, the placement head is not limited to the configuration adopted in this way, and may be configured so that the route of all fiber bundles is provided at the same one position in the back and forth direction.

When the automated fiber bundle placement device is configured to place a large number of the fiber bundles as described above, in order to avoid a size increase in the placement head in relation to the number of the fiber bundles, it is preferable to configure the placement head so that the route is divided into a plurality of routes in the back and forth direction. However, as long as the size of the placement head is acceptable as a device in relation to the configuration of the device included in the placement head, even when the number of the fiber bundles to be placed is large as in the above-described embodiment, the placement head may be configured so that the routes are located at the same position in the back and forth direction.

In the automated fiber bundle placement device of the present invention, the number of the fiber bundles to be placed is not particularly limited. Therefore, depending on the number of the fiber bundles (when the number is small), even when the routes are located at the same position, the size of the placement head does not increase, compared to that of the above-described embodiment. However, even when the number of the fiber bundles to be placed is small, the placement head may be configured to divide the route to the plurality of locations in the back and forth direction. As described above, the configuration for the route in the placement head may be appropriately adopted in view of the number of the fiber bundles or the size of the placement head.

The present invention is not limited to the embodiments and the modification examples which are described above, and various modifications can be made without departing from the concept of the present invention.

What is claimed is:

1. An automated fiber bundle placement device comprising:
   a supply device configured so that a plurality of bobbins around which fiber bundles are wound are installed to supply the fiber bundles from each of the bobbins;
   a placement head for placing each of the fiber bundles supplied from the supply device on a placement die; and
   an articulated robot having the placement head attached thereto to move the placement head for the placement,
   wherein the placement head includes a pressing unit that presses the fiber bundle onto the placement die, a feeding mechanism that feeds the fiber bundle toward the pressing unit, and a cutting device that cuts the fiber bundle between the pressing unit and the feeding mechanism,
   the cutting device includes a cutting blade provided for each route of the fiber bundle to intersect with a traveling direction of the fiber bundle, a securing member provided to pinch the route with the cutting blade, and a drive mechanism for causing displacement of the cutting blade toward a cutting position on the securing member side,
   the drive mechanism includes a plate-shaped movable unit provided for each of the cutting blades, to which the cutting blade corresponding thereto is attached, a support unit supporting the movable unit to be displaceable, having a plate-shaped part, and facing the movable unit in the plate-shaped part, a permanent magnet provided in one of a part facing the plate-shaped part of the support unit in the movable unit and a part facing the movable unit in the plate-shaped part of the support unit, and an exciting coil provided in the other, and
   the permanent magnet and the exciting coil are provided so that the movable unit is displaced as the exciting coil is excited.

2. The automated fiber bundle placement device according to claim 1,
   wherein the movable unit is supported to be capable of rocking with respect to the support unit.

3. The automated fiber bundle placement device according to claim 1,
   wherein the support unit is provided for each of the movable units.

4. The automated fiber bundle placement device according to claim 2,
   wherein the support unit is provided for each of the movable units.

5. The automated fiber bundle placement device according to claim 1,
   wherein both the displacement of the cutting blade and retreating of the cutting blade from the cutting position are performed by excitation of the exciting coil.

6. The automated fiber bundle placement device according to claim 2,
   wherein both the displacement of the cutting blade and retreating of the cutting blade from the cutting position are performed by excitation of the exciting coil.

7. The automated fiber bundle placement device according to claim 3,
   wherein both the displacement of the cutting blade and retreating of the cutting blade from the cutting position are performed by excitation of the exciting coil.

8. The automated fiber bundle placement device according to claim 4,
   wherein both the displacement of the cutting blade and retreating of the cutting blade from the cutting position are performed by excitation of the exciting coil.

* * * * *